(12) United States Patent
Chan et al.

(10) Patent No.: US 10,236,511 B2
(45) Date of Patent: Mar. 19, 2019

(54) NITROGEN SUBSTITUTED CARBON AND SILICON CLATHRATES

(71) Applicant: Southwest Research Institute, San Antonio, TX (US)

(72) Inventors: Kwai S. Chan, San Antonio, TX (US); Michael A. Miller, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 2 days.

(21) Appl. No.: 15/147,438

(22) Filed: May 5, 2016

(65) Prior Publication Data

US 2016/0248092 A1 Aug. 25, 2016

Related U.S. Application Data

(62) Division of application No. 14/022,822, filed on Sep. 10, 2013, now Pat. No. 9,362,559.

(51) Int. Cl.
| | | |
|---|---|---|
| *H01B 1/04* | (2006.01) | |
| *H01M 4/38* | (2006.01) | |
| *H01M 4/58* | (2010.01) | |
| *H01M 4/60* | (2006.01) | |
| *C01B 21/06* | (2006.01) | |
| *C01B 21/068* | (2006.01) | |
| *H01M 10/0525* | (2010.01) | |

(52) U.S. Cl.
CPC ............ *H01M 4/58* (2013.01); *C01B 21/0602* (2013.01); *C01B 21/0605* (2013.01); *C01B 21/068* (2013.01); *H01M 4/386* (2013.01); *H01M 4/60* (2013.01); *H01M 10/0525* (2013.01); *C01P 2002/72* (2013.01)

(58) Field of Classification Search
CPC ........ H01M 4/386; H01M 4/1395; H01B 1/04
USPC ...................................................... 252/521.3
See application file for complete search history.

(56) References Cited

U.S. PATENT DOCUMENTS

| | | | |
|---|---|---|---|
| 5,800,794 | A | 9/1998 | Tanigaki et al. |
| 6,188,011 | B1 | 2/2001 | Nolas et al. |
| 6,423,286 | B1 | 7/2002 | Gryko |
| 6,461,581 | B1 | 10/2002 | Eguchi et al. |
| 6,525,260 | B2 | 2/2003 | Yamashita et al. |
| 6,797,199 | B2 | 9/2004 | Eguchi et al. |
| 7,534,414 | B2 | 5/2009 | Nolas et al. |

(Continued)

FOREIGN PATENT DOCUMENTS

| | | |
|---|---|---|
| JP | 09-194206 A | 7/1997 |
| JP | 2009-170287 A | 7/2009 |
| WO | 2013158307 A1 | 10/2013 |

OTHER PUBLICATIONS

Adams et al., Wide-band-gap Si in open fourfold-coordinated clathrate structures, The American Physical Society, Physical Review B, Mar. 15, 1994, pp. 8048-8053, vol. 49, No. 12.

(Continued)

*Primary Examiner* — Tri V Nguyen
(74) *Attorney, Agent, or Firm* — Grossman, Tucker et al.

(57) ABSTRACT

Compositions comprising Type I clathrates of silicon ($Si_{46}$) or carbon ($C_{46}$) wherein the framework of the cage structure includes nitrogen and carbon or nitrogen and silicon or nitrogen-silicon-carbon atom type composition, with or without guest atoms in their respective cage structures. The clathrate structures are particularly useful for energy storage applications such as battery electrodes.

5 Claims, 7 Drawing Sheets

(56) References Cited

U.S. PATENT DOCUMENTS

| | | | |
|---|---|---|---|
| 8,722,247 | B2 | 5/2014 | Miller et al. |
| 8,906,551 | B2 | 12/2014 | Chan et al. |
| 8,968,929 | B2 | 3/2015 | Chan et al. |
| 8,993,165 | B2 | 3/2015 | Miller et al. |
| 9,362,559 | B2 | 6/2016 | Chan et al. |
| 9,564,633 | B2 | 2/2017 | Chan et al. |
| 2003/0197156 | A1 | 10/2003 | Eguchi et al. |
| 2008/0226836 | A1 | 9/2008 | Nolas et al. |
| 2010/0230632 | A1 | 9/2010 | Adamson et al. |
| 2011/0226299 | A1 | 9/2011 | Makansi |
| 2011/0253205 | A1 | 10/2011 | Grossman et al. |
| 2012/0021283 | A1 | 1/2012 | Chan et al. |
| 2012/0295160 | A1 | 11/2012 | Miller et al. |
| 2013/0280609 | A1 | 10/2013 | Chan et al. |
| 2014/0302391 | A1 | 10/2014 | Miller et al. |
| 2014/0374673 | A1 | 12/2014 | Chan et al. |
| 2015/0069309 | A1 | 3/2015 | Chan et al. |

OTHER PUBLICATIONS

Beattie et al., Si Electrodes for Li-Ion Batteries—A New Way to Look at an Old Problem, Journal of The Electrochemical Society, 2008, pp. A158-A163, vol. 155 (2).

Blase, et al, "Structural, Mechanical and Superconducting Properties of Clathrates", Computer-Based Modeling of Novel Carbon Systems and Their Properties, Carbon Materials: Chemistry and Physics 3, Chapter 6, pp. 171-206, 2010).

Brooksbank et al., Tessellated Stresses Associated With Some Inclusions in Steel, Journal of the Iron and Steel Institute, Apr. 1969, pp. 474-483.

Chan et al., High-performance lithium battery anodes using silicon nanowires, nature nanotechnology—Letters, Jan. 2008, pp. 31-35, vol. 3.

Connetable et al., Superconductivity in Doped sp3 Semiconductors: The Case of the Clathrates, The American Physical Society—Physical Review Letters, Dec. 12, 2003, pp. 247001-1-247001-4, vol. 91, No. 24.

CPMD—Car-Parrinello Molecular Dynamics—Manual, An ab initio Electronic Structure and Molecular Dynamics Program, The CPMD consortium, Sep. 4, 2008, 258 pages.

Cui et al., Crystalline-Amorphous Core-Shell Silicon Nanowires for High Capacity and High Current Battery Electrodes, American Chemical Society—Nano Letters, Dec. 1, 2008, 5 pages.

Eom et al., Electrochemical Insertion of Lithium into Multiwalled Carbon Nanotube/Silicon Composites Produced by Ballmilling, Journal of the Electrochemical Society, 2006, pp. A1678-A1684, vol. 153 (9).

Graetz et al., Highly Reversible Lithium Storage in Nanostructured Silicon, Electrochemical and Solid-State Letters, 2003, A194-A197, vol. 6 (9).

Green et al., Structured Silicon Anodes for Lithium Battery Applications, Electrochemical and Solid-State Letters, 2003, A75-A79, vol. 6 (5).

Grovenstein, et al., "Cleavage of tetraalkylammonium halides by sodium in liquid ammonia" J. Am. Chem. Soc. 1959, 81, 4850-4857.

Huggins et al., Decrepitation Model for Capacity Loss During Cycling of Alloys in Rechargeable Electrochemical Systems, Ionics, 2000, 8 pages, vol. 6.

Imai, et al, "Synthesis of a Si-clathrate Compound, Sr8GaxSi46-8, and Its Electrical Resistivity Measurements"; Journal of Alloys and compounds 335, 2002, pp. 270-276.

Kim et al., Three-Dimensional Porous Silicon Particles for Use in High-Performance Lithium Secondary Batteries, Angewandte Chemie—Anode Materials, 2008, pp. 10151-10154, vol. 47.

Lewis et al., In Situ AFM Measurements of the Expansion of Contraction of Amorphous Sn-Co-C Films Reacting with Lithium, Journal of the Electrochemical Society, 2007, pp. A213-A216, vol. 154 (3).

Manthiram, et al., "Low temperature synthesis of insertion oxides for lithium batteries." Chem. Mater. 1998, 10, 2895-2909.

Melinon et al., Phonon density of states of silicon clathrates: Characteristic width narrowing effect with respect to the diamond phase, The American Physical Society, Apr. 15, 1999, pp. 10 099-10 104, vol. 59, No. 15.

Miguel et al., A New Class of Low Compressibility Materials: Clathrates of Silicon and Related Materials, High Pressure Research, 2002, pp. 539-544, vol. 22.

Nakano, et al., "Soft xray photoelectron spectroscopy in silicon clathrate superconductors," SPring-8 Res Front 2001B/2002A, p. 51-53 (2003).

Perottoni, C.A., et al "The Carbon Analogues of Type-I Silicon Clathrates"; Institute of Physics Publishing; Journal of Physics: Condensed Matter; Matter 13 (2001), pp. 5981-5998.

Ryu et al., Failure Modes of Silicon Powder Negative Electrode in Lithium Secondary Batteries, Electrochemical and Solid-State Letters, 2004, A306-A309, vol. 7 (10).

San-Miguel, et al., "High-pressure properties of group IV clathrates." High Pressure Research 2005, 25(3), 159-185.

Takamura et al., A vacuum deposited Si film having a Li extraction capacity over 2000 mAh/g with a long cycle life, Journal of Power Sources, 2004, pp. 96-100, vol. 129.

Timmons et al., In Situ Optical Observations of Particle Motion in Alloy Negative Electrodes for Li-Ion Batteries, Journal of the Electrochemical Society, 2006, pp. A1206-A1210, vol. 153 (6).

Timmons et al., Isotropic Volume Expansion of Particles of Amorphous Metallic Alloys in Composite Negative Electrodes for Li-Ion Batteries, Journal of the Electrochemical Society, 2007, pp. A444-A448, vol. 154 (5).

Tsujii, et al, "Phase Stability and Chemical Composition Dependence of the Thermoelectric Properties of the Type-I Clathrate Ba8AlxSi46-x (8 < x < 15)"; Journal of Solid State Chemistry 184, 2011, pp. 1293-1303.

Wen et al., Chemical Diffusion in Intermediate Phases in the Lithium-Silicon System, Journal of Solid State Chemistry, 1981, pp. 271-278, vol. 37.

Yang et al, Small particle size multiphase Li-alloy anodes for lithium-ion-batteries, Solid State Ionics, 1996, pp. 281-287, vol. 90.

Yoshio, et al, "Lithium-Ion Batteries, Science and Technologies", 2009 Springer ISBN: 978-0-387-34444-7, e-ISBN: 978-0-387-34445-4, DOI: 10,1007/978-0-387-34445-4.

Zhang et al., Composite anode material of silicon/graphite/carbon nanotubes for Li-ion batteries, Electrochimica Acta, 2006, pp. 4994-5000, vol. 51.

Zhang et al., Pyrolytic carbon-coated silicon/Carbon Nanotube composites: promising application for Li-ion batteries, Int. J. Nanomanufacturing, 2008, pp. 4-15, vol. 2, Nos. 1/2.

International Search Report and Written Opinion of the ISA/KR (12 pgs); dated Jun. 25, 2013; issued in related matter PCT/US2013/032430.

U.S. Office Action dated Mar. 19, 2013 in U.S. Appl. No. 12/842,224 (10 pgs).

U.S. Office Action dated Oct. 31, 2013 in U.S. Appl. No. 12/842,224 (12 pgs).

U.S. Office Action dated May 12, 2014 in U.S. Appl. No. 12/842,224 (13 pgs).

U.S. Office Action dated Jun. 26, 2013 in U.S. Appl. No. 13/109,704 (16 pgs).

U.S. Office Action dated Mar. 27, 2014 in U.S. Appl. No. 13/452,403 (15 pgs).

U.S. Office Action dated Apr. 7, 2015 in U.S. Appl. No. 13/924,949 (16 pgs).

U.S. Office Action dated Jul. 28, 2015 in U.S. Appl. No. 14/022,822 (11 pgs).

U.S. Office Action dated Oct. 7, 2015 in U.S. Appl. No. 13/924,949 (14 pgs).

U.S. Office Action dated Apr. 7, 2016 in U.S. Appl. No. 13/924,949 (12 pgs).

NITROGEN SUBSTITUTED CARBON AND SILICON CLATHRATES

CROSS REFERENCE TO RELATED APPLICATIONS

The present application is a divisional of U.S. application Ser. No. 14/022,822, filed Sep. 10, 2013, the teachings of which are incorporated herein by reference.

FIELD OF THE INVENTION

The present disclosure relates to the compositions, structures and synthesis method of clathrate compounds wherein the framework of the cage structure includes nitrogen and carbon atoms or nitrogen and silicon atoms or a nitrogen-carbon-silicon atom composition, with and without guest atoms in their respective cage structures. These clathrates are suitable for use as thermoelectric materials, electronic materials, energy storage and relatively high modulus materials.

BACKGROUND

U.S. application Ser. No. 12/842,224 discloses, among other things, an electrode and methods for forming such electrode for a battery wherein the electrode comprises silicon clathrate. The silicon clathrate may include silicon clathrate $Si_{46}$ containing an arrangement of 20-atom and 24-atom cages fused together through 5 atom pentagonal rings and/or silicon clathrate $Si_{34}$ containing an arrangement of 20-atom and 28-atom cages fused together through 5 atom pentagonal rings.

U.S. application Ser. No. 13/109,704 discloses, among other things, clathrate (Type I) allotropes of silicon, germanium and tin that may be used for an electrode in lithium-ion batteries.

U.S. application Ser. No. 13/452,403 discloses, among other things, alloy cage structures of silicon, germanium and/or tin for use as an electrode in rechargeable batteries.

U.S. application Ser. No. 13/924,949 discloses, among other things, the composition and synthesis of clathrate compounds with a silicon and carbon framework.

SUMMARY

A composition comprising a Type I clathrate of carbon having a $C_{46}$ framework cage structure wherein the carbon atoms on said framework are at least partially substituted by nitrogen atoms, said composition represented by the formula $N_yC_{46-y}$ with $1 \le y \le 45$. The composition may include guest atoms as represented by the formula $A_xN_yC_{46-y}$ where, A=H, Li, Na, K, Rb, Cs, Fr, Be, Mg, Ca, Sr, Ba, Ra, Eu, Cl, Br, I, and any metal or metalloid element, with $1 \le y \le 45$ and x is the number of guest atoms within said cage structure.

A composition comprising a Type I clathrate of silicon having a $Si_{46}$ framework cage structure wherein the silicon atoms on said framework are at least partially substituted by nitrogen atoms, said composition represented by the formula $N_ySi_{46-y}$ with $1 \le y \le 45$. The composition may include guest atoms as represented by the formula $A_xN_ySi_{46-y}$ where, A=H, Li, Na, K, Rb, Cs, Fr, Be, Mg, Ca, Sr, Ba, Ra, Eu, Cl, Br, I, and any metal or metalloid element, with $1 \le y \le 45$ and x is the number of guest atoms within said cage structure.

A composition comprising a Type I clathrate of silicon having a $Si_{46}$ framework cage structure wherein the silicon atoms on said framework are at least partially substituted by nitrogen and carbon, said composition represented by the formula $N_yC_zSi_{46-y-z}$ with $1 \le y \le 44$ and $1 \le z \le 45-y$. The composition may include guest atoms represented by the formula $A_xN_yC_zSi_{46-y-z}$ where, A=H, Li, Na, K, Rb, Cs, Fr, Be, Mg, Ca, Sr, Ba, Ra, Eu, Cl, Br, I, and any metal or metalloid element, with $1 \le y \le 45$ and $1 \le z \le 45-y$ and x is the number of guest atoms within said cage structure.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

Figure 1:
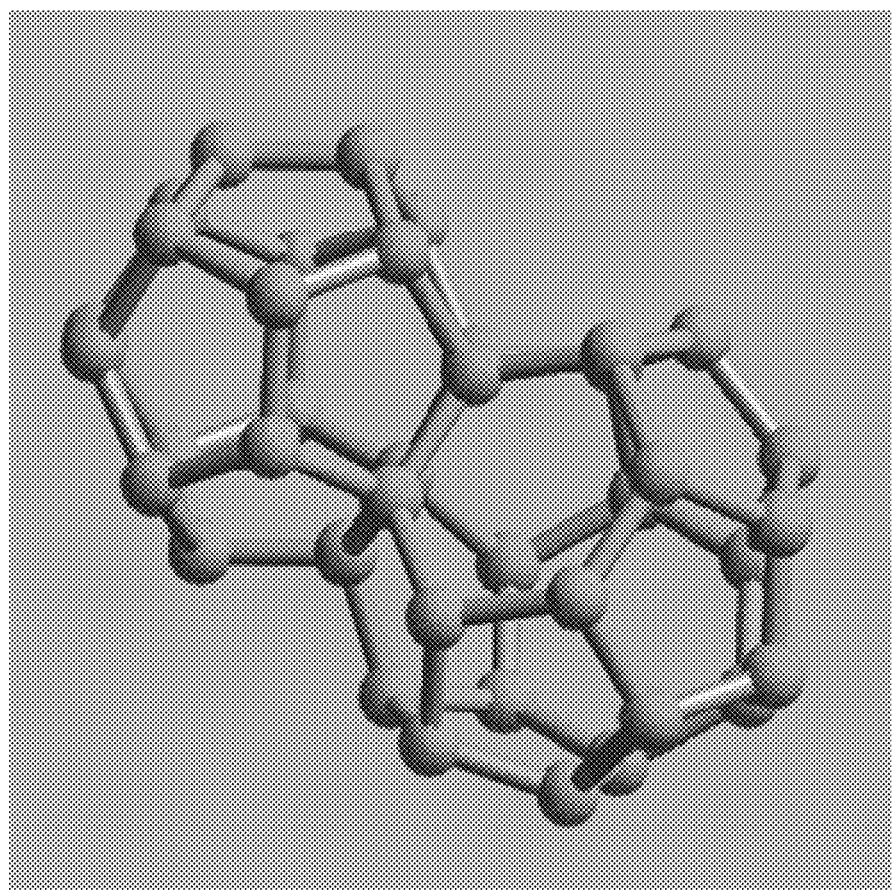
FIG. 1 illustrates $Si_{20}$ and $Si_{24}$ cages as the building unit of the representative Type I $Si_{46}$ clathrate, without guest atoms.

Silicon clathrate $Si_{46}$ comprises crystalline Si with a regular arrangement of 20-atom and 24-atom cages fused together through 5 atom pentagonal rings (Type I clathrate). It has a simple cubic structure with a lattice parameter of 10.335 Å and 46 Si atoms per unit cell. FIG. 1 illustrates the cage structure of the $Si_{46}$, which belongs to the Space group Pm$\bar{3}$n and Space Group Number 223. The crystal structure of the silicon clathrate ($Si_{46}$) is different from the common form of crystalline Si (c-Si), which is diamond cubic with a lattice parameter of about 5.456 Å and belongs to the Space Group Fd$\bar{3}$m, Number 227.

Another form of silicon clathrate is $Si_{34}$ (Type II clathrate) that comprises crystalline Si with a regular arrangement of 20 atoms and 28 atom cages fused together through five-atom pentagonal rings. Type II $Si_{34}$ clathrate has a face-centered cubic (fcc) structure, with 34 Si atoms per fcc unit cell. The $Si_{34}$ clathrate has a lattice parameter of 14.62 Å and belongs to the Space Group Fd$\bar{3}$m, Number 227. Type II silicon clathrate is sometimes referred to as $Si_{136}$ since the compound contains four fcc unit cells. A third form of silicon clathrate is a modification of the $Si_{46}$ type formed by removing four atoms from the 24-atom cages.

Theoretical computations have shown that both Type I carbon clathrate ($C_{46}$) and Type II carbon clathrate ($C_{136}$ or $C_{34}$) may exist as metastable phases under high pressures. The cage structure of Type I carbon clathrate, $C_{46}$, is similar to that of $Si_{46}$ shown in FIG. 1. Insertion of guest atoms such as Li, Na, or Ba into the cage structures has been predicted to be feasible under high pressures. However, the energy of formation for the Type I and Type II carbon clathrates are extremely high and as presently known the syntheses of neither Type I nor Type II carbon clathrates have been reported.

Figure 2:
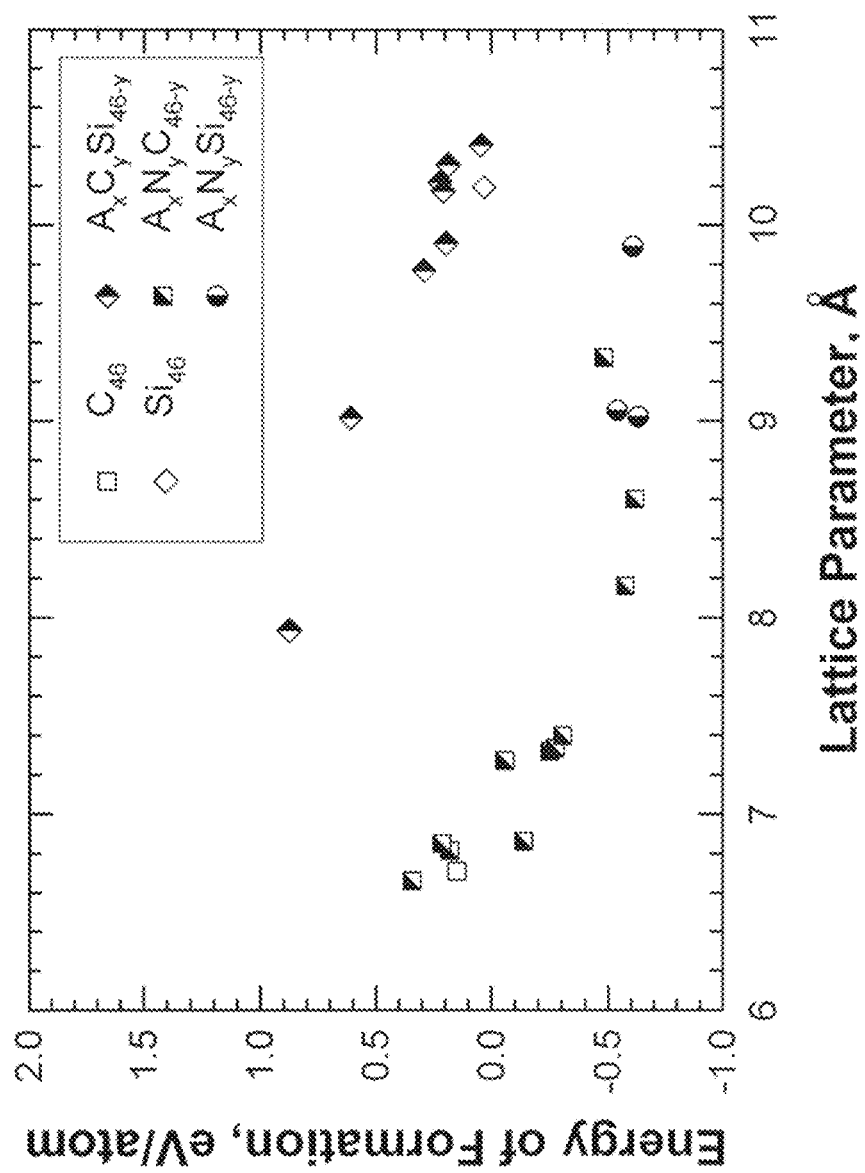
FIG. 2 compares the energy of formation of $A_xC_ySi_{46-y}$, $A_xN_yC_{46-y}$ and $A_xN_ySi_{46-y}$ against those of $C_{46}$ and $Si_{46}$ clathrates as a function of lattice parameter showing nitrogen substitution of the framework atoms on $C_{46}$ or $Si_{46}$ results in stable carbon or silicon clathrate compounds.

FIG. 2 is a summary plot that depicts the energy of formation for carbon-substituted and nitrogen-substituted clathrate compounds, which include $A_xC_ySi_{46-y}$, $A_xN_yC_{46-y}$, and $A_xN_ySi_{46-y}$, against those of $C_{46}$ and $Si_{46}$. Nitrogen substitution was therefore identified to lower the energy of formation and produce stable carbon and silicon clathrates. These computations led to the identification of three new classes of nitrogen-substituted Type I clathrates based on the carbon or silicon framework: (1) N-substituted carbon clathrates ($N_yC_{46-y}$), (2) N-substituted silicon clathrates ($N_ySi_{46-y}$), and (3) N-substituted hybrid carbon silicon clathrates ($N_yC_zSi_{46-y-z}$).

Carbon-Nitrogen Clathrates

Figure 3:
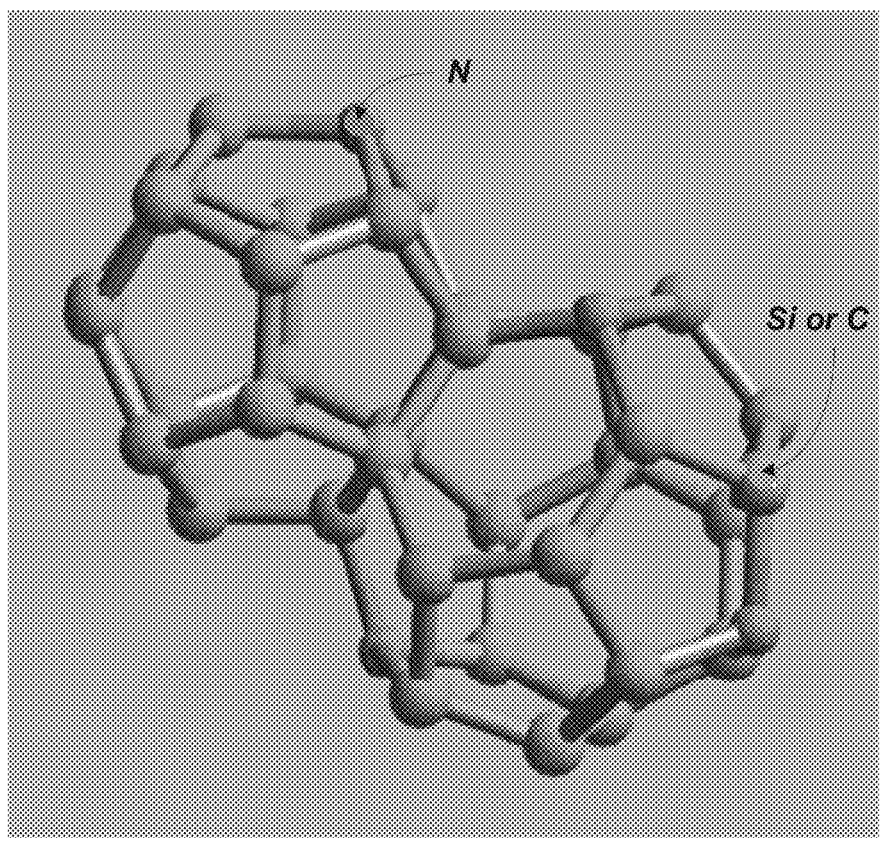
FIG. 3 illustrates a Type I $N_yC_{46-y}$ clathrate or a nitrogen-silicon clathrate, $N_ySi_{46-y}$, without guest atoms.
Figure 4:
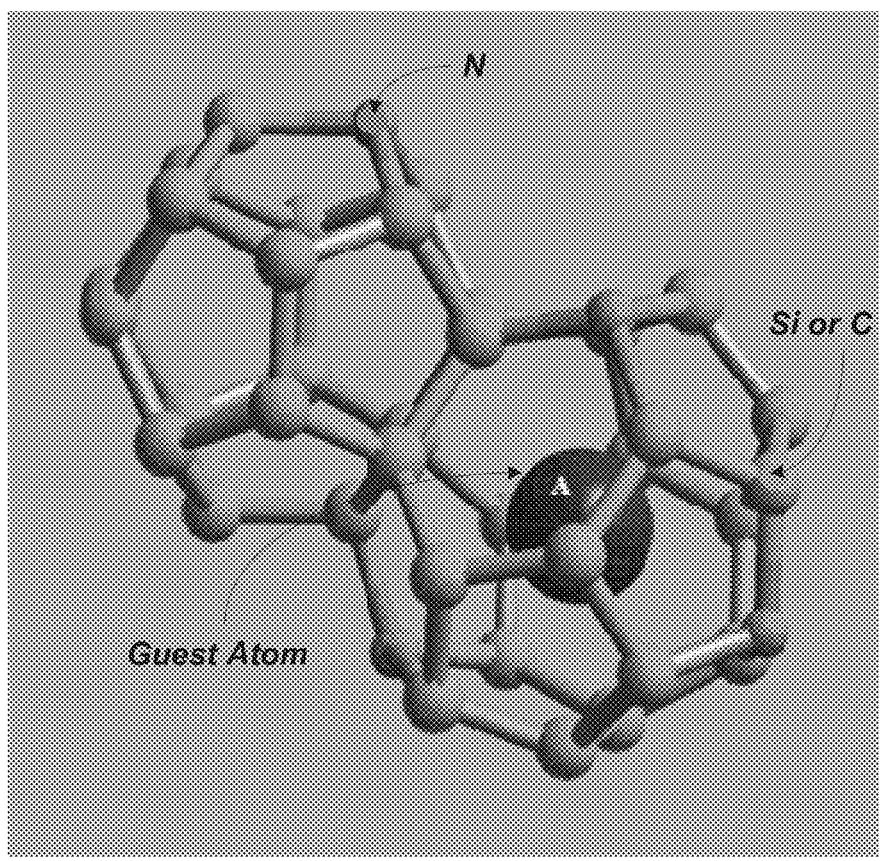
FIG. 4 illustrates a Type I guest-atom stabilized nitrogen-carbon clathrate ($A_xN_yC_{46-y}$) or nitrogen-silicon clathrate ($A_xN_ySi_{46-y}$) with x number of guest atoms A within the cage.
Figure 5:
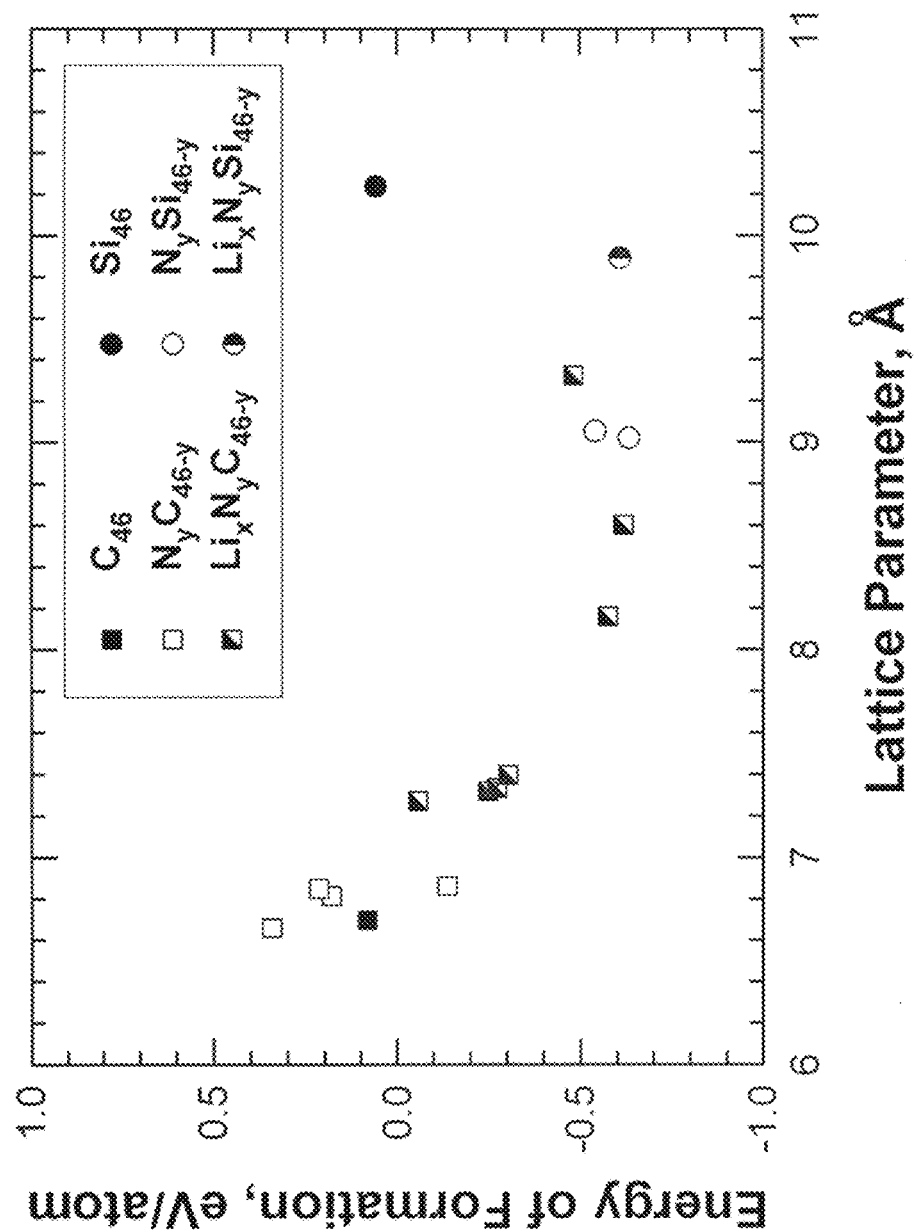
FIG. 5 illustrates the values of the energy of formation of $N_ySi_{46-y}$ are compared against those of $C_{46}$, $Si_{46}$ and $Li_xN_yC_{46-y}$.

Computational studies on the Type I carbon and silicon clathrate allotropes indicated that the carbon atoms in the theoretical $C_{46}$ framework can be partially substituted by nitrogen atoms to form a hybrid carbon-nitrogen clathrate, which can be represented by $N_yC_{46-y}$. FIG. 3 shows a representation of the Type I $N_yC_{46-y}$ clathrate or nitrogen-silicon clathrate, $N_ySi_{46-y}$, without guest atoms. Accordingly, guest atoms can be inserted into such cage structure to stabilize the clathrate by reducing the energy of formation to form, e.g., a class of nitrogen-substituted carbon clathrates, represented as $A_xN_yC_{46-y}$, where A indicates the guest atom. FIG. 4 shows a structural representation of the Type I $A_xN_yC_{46-y}$ clathrate compounds where x has a value of 0-200. That is, the value of x will depend upon the size of guest atom introduced. The values of the energy of formation of $N_ySi_{46-y}$ are compared against those of $C_{46}$, $Si_{46}$ and $Li_xN_yC_{46-y}$ in FIG. 5. For the compositions considered, the $N_ySi_{46-y}$ compounds are stable compounds as their energy of formation values are negative.

Expanding upon the above, the $N_yC_{46-y}$ clathrate contains y nitrogen atoms and 46−y carbon atoms with a regular arrangement of 20-atom and 24-atom cages fused together through 5 atom pentagonal rings (Type I clathrate). It has a simple cubic structure with a lattice parameter in the range of 6.66 Å to 6.86 Å and a combined sum of 46 N and C atoms per unit cell. In addition, vacancies can be inserted into the N-substituted carbon framework and the sum of N atoms, C atoms and vacancies is 46. The number of vacancies may range from zero to eight (8). Like $Si_{46}$, the crystal structure of $N_yC_{46-y}$ clathrate belongs to the Space group Pm$\bar{3}$n, Number 223. The number of N atoms on the nitrogen-carbon framework lies between 1 and 45 ($1 \le y \le 45$).

In the case of guest atoms disposed in the carbon-nitrogen clathrates, as noted, the general formula is $A_xN_yC_{46-y}$, where, A=H, Li, Na, K, Rb, Cs, Fr, Be, Mg, Ca, Sr, Ba, Ra, Eu, Cl, Br, I, and any metal or metalloid element capable of occupying the empty spaces inside the cages of this Type I clathrate structure. Examples include, but are not limited to, $Ba_xN_{18}C_{23}$, $Ba_xN_{18}C_{28}$, $Ba_xN_{18}C_{24}$, $Ba_xN_{23}C_{23}$, $Li_xN_{18}C_{23}$, $Li_xN_{18}C_{28}$, $Li_xN_{18}C_{24}$, $Li_xN_{23}C_{23}$, or similar permutations of C and N with y being an integer, a fraction, or a number plus a fractional part. In all cases, however, it is understood that C and N constitute the clathrate crystallographic structure belonging to the space group Pm$\bar{3}$n and $A_x$ represent guest atoms occupying the void volume of the clathrate cages. The number of guest atoms, x, that can occupy inside the cage structure depends on the atomic size of A. For relatively large atoms such as Ba, the number of Ba atoms intercalated within the cage structure is preferably eight or less ($0 \le x \le 8$). For relatively smaller atoms such as Li, the number of Li atoms, x, intercalated within the cage structures depends on the specific form and stoichiometric ratio of C and N, but in practical terms x is limited to a value defined by the onset of significant expansion of the lattice parameter, beyond which irreversible structural damage is likely to occur in the bulk material.

Accordingly, in the clathrate structure defined by the equation $A_xN_yC_{46-y}$ may be understood as one that, upon intercalcation of guest atom A, the value of x is selected such that the cage structure will preferably undergo a volume expansion of less than or equal to 50.0%, or in the range of 0.1% to 50.0% in 0.1% increments. In related context, the clathrate structure is one that upon deintercalcation, preferably undergoes a volume change (contraction) of 50.0% or less, or in the range of 0.1% to 50.0% in 0.1% increments.

Figure 6:
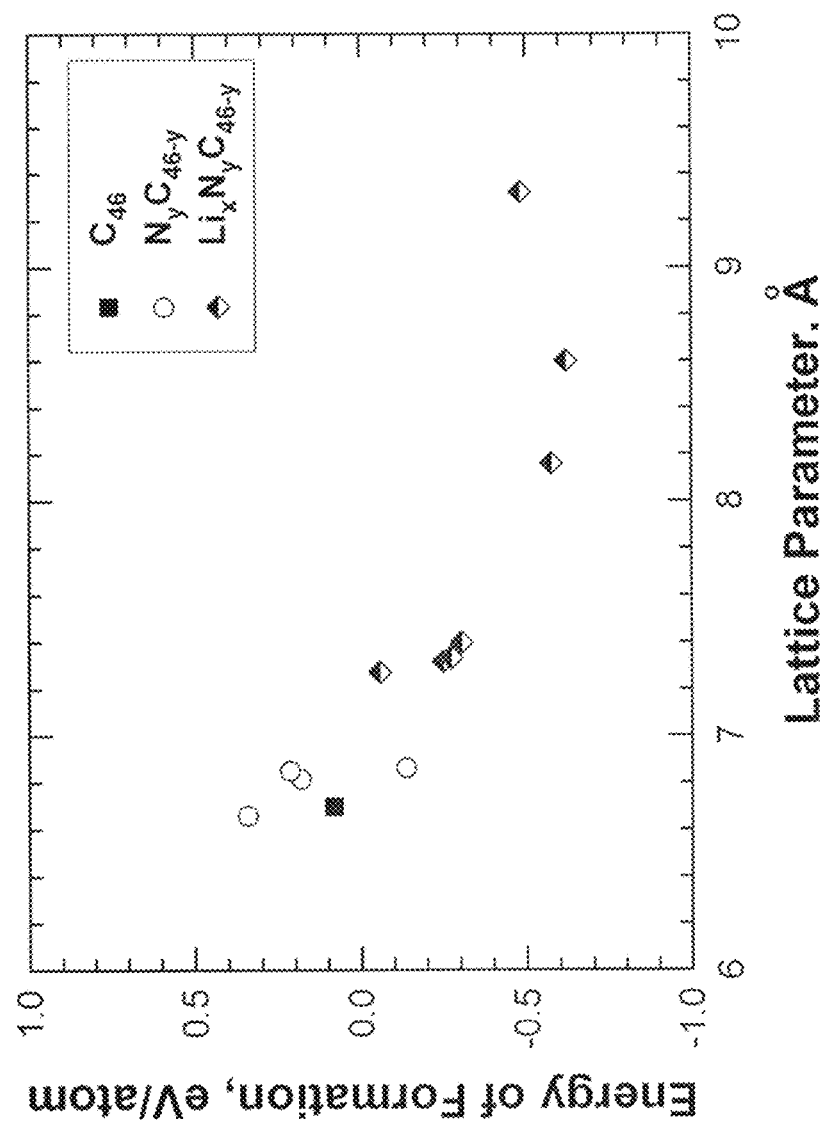
FIG. 6 illustrates the computed values of the energy of formation per atom for $C_{46}$, $N_yC_{46-y}$, and $Li_xN_yC_{46-y}$ are compared as a function of the lattice parameter.

It can next be noted that the energy of formation for the carbon-nitrogen and silicon-nitrogen clathrates with Li guest atoms were computed using the first-principles Car-Parrinello Molecular Dynamics (CPMD) code. The computed values of the energy of formation per atom for $C_{46}$, $N_yC_{46-y}$, and $Li_xN_yC_{46-y}$ are compared as a function of the lattice parameter in FIG. 6, which compares the energy of formation for $C_{46}$ and $N_yC_{46-y}$ without and with Li guest atoms. Nitrogen substitution lowers the energy of formation of $N_yC_{46-y}$ compared to that for $C_{46}$. Li insertion reduces the energy of formation further to negative values, which indicates that $Li_xN_yC_{46-y}$ are stable compounds.

More specifically, insertion of Li atoms into N-substituted carbon clathrates reduces the energy of formation but increases the lattice constant of the unit cell. Type I, N-substituted carbon clathrates with Li guest atoms, represented by the formula $Li_xN_yC_{46-y}$, has a simple cubic structure with a lattice parameter in the range of 6.66 Å to 9.32 Å. The N-substituted carbon framework has a combined sum of 46 N and C atoms per unit cell and the number of Li guest atom ranges from 0 to 48 ($0<x<48$) for the range of lattice parameter cited. In addition, vacancies can again be inserted into the N-substituted carbon framework and the sum of N atoms, C atoms, and vacancies remains 46. The crystal structure of the $Li_xN_yC_{46-y}$ clathrates belongs to the Space group Pm$\bar{3}$n, Number 223. The number of N atoms on the hybrid nitrogen-carbon framework including the guest atoms again lies between 1 and 45 ($1 \le y \le 45$).

Nitrogen-Silicon Clathrates

As alluded to above, the silicon atoms on the $Si_{46}$ framework can now be partially substituted by nitrogen to form a nitrogen-silicon clathrate, represented by the formula $N_ySi_{46-y}$. See again, FIG. 3. The $N_ySi_{46-y}$ clathrate can also be configured with guest atoms leading to the formula $A_xN_ySi_{46-y}$. More specifically, nitrogen-silicon framework that is represented by $N_ySi_{46-y}$ comprises y nitrogen atoms and 46−y silicon atoms with a regular arrangement of 20-atom and 24-atom cages fused together through 5 atom pentagonal rings (Type I clathrate). It has a simple cubic structure with a lattice parameter in the range of 9.0 Å to 10.23 Å and a combined sum of 46 N and Si atoms per unit cell. In addition, vacancies can be inserted into the N-substituted silicon framework and the sum of N atoms, Si atoms, and vacancies remains 46. The number of vacancies may range from zero to eight (8). The crystal structure of the $N_ySi_{46-y}$ clathrates belongs to the Space group Pm$\bar{3}$n, Number 223. The number of N atoms on the hybrid nitrogen-silicon framework lies between 1 and 45 ($1 \le y \le 45$).

As therefore noted, nitrogen-silicon clathrates stabilized by guest atoms are represented by the formula $A_xN_ySi_{46-y}$, where A=H, Li, Na, K, Rb, Cs, Fr, Be, Mg, Ca, Sr, Ba, Ra, Eu, Cl, Br, I, and any metal or metalloid element capable of occupying the empty spaces inside the large cages of the Type I clathrate structure. Examples include, but are not limited to, $Ba_xN_{18}Si_{23}$, $Ba_xN_{18}Si_{28}$, $Ba_xN_{18}Si_{24}$, $Ba_xN_{23}Si_{23}$, $Li_xN_{18}Si_{23}$, $Li_xN_{18}Si_{28}$, $Li_xN_{18}Si_{24}$, $Li_xN_{23}Si_{23}$, or similar permutations of N and Si with y being an integer, a fraction, or a number plus a fractional part. In all cases, however, it is understood that N and Si constitute the clathrate crystallographic structure belonging to the space group Pm3̄n and $A_x$ represent guest atoms occupying the void volume of the clathrate cages. The number of guest atoms, x, that can occupy inside the cage structure depends on the atomic size of A and may range from zero to 200 or even higher, depending on the size of the guest atom. For relatively large atoms such as Ba, the number of Ba atoms intercalated within the cage structure is eight or less (0≤x≤8). For relatively small atoms such as Li, the number of Li atoms, x, intercalated within the cage structures depends on the specific form and stoichiometric ratio of N and Si, but in practical terms x is limited to a value defined by the onset of significant expansion of the lattice parameter, beyond which irreversible structural damage is likely to occur in the bulk material.

Accordingly, in the clathrate structure defined by the equation $A_xN_ySi_{46-y}$ may be understood as one that, upon intercalcation of guest atom A, the value of x is selected such that the cage structure will preferably undergo a volume expansion of less than or equal to 50.0%, or in the range of 0.1% to 50.0% in 0.1% increments. In related context, the clathrate structure is one that upon deintercalcation, preferably undergoes a volume change (contraction) of 50.0% or less, or in the range of 0.1% to 50.0% in 0.1% increments.

More specifically, insertion of Li atoms into N-substituted carbon-silicon clathrates reduces the energy of formation but increases the lattice constant of the unit cell. Type I, N-substituted carbon-silicon clathrates with Li guest atoms, represented by the formula $Li_xN_yC_zSi_{46-y-z}$, has a simple cubic structure with a lattice parameter in the range of 6.4 Å to 10.4 Å. The N-substituted silicon framework has a combined sum of 46 N, C, and Si atoms per unit cell and the number of Li guest atom ranges from 0 to 48 (0<x<48) for the range of lattice parameter cited. In addition, vacancies can be inserted into the N-substituted carbon-silicon framework and the sum of N atoms, C atoms, Si atoms, and vacancies remains 46. The number of vacancies may range from zero to eight (8). The crystal structure of the $Li_xN_yC_zSi_{46-y-z}$ clathrate belongs to the Space group Pm3̄n, Number 223. The number of N atoms on the hybrid nitrogen-silicon framework can lie between 1 and 44 (1≤y≤44) and the number of C atoms on the hybrid nitrogen-carbon-silicon framework can lie between 1 and 45−y (1≤z≤45−y), while the total number of C, N, Si, and vacancies, if present, must be 46.

Nitrogen/Carbon/Silicon Clathrates

As alluded to above, the present disclosure also is directed at Type I nitrogen-carbon-silicon clathrates with nitrogen, carbon and silicon atoms in the framework of the cage wherein the composition is represented by the formula $N_yC_zSi_{46-y-z}$ with 1≤y≤44 and 1≤z≤45−y.

In addition, the present disclosure also is directed at nitrogen-carbon-silicon clathrates stabilized by guest atoms represented by the formula $A_xN_yC_zSi_{46-y-z}$, where A=H, Li, Na, K, Rb, Cs, Fr, Be, Mg, Ca, Sr, Ba, Ra, Eu, Cl, Br, I, and any metal or metalloid element capable of occupying the empty spaces inside the large cages of the Type I clathrate structure. The value of x may be zero to 200 or greater, depending upon the size of the guest atom.

Examples include, but are not limited to, $Ba_xN_8C_{10}Si_{23}$, $Ba_xN_8C_{10}Si_{28}$, $Ba_xN_8C_{10}Si_{24}$, $Ba_xN_8C_{14}Si_{24}$, $Li_xN_8C_{10}Si_{23}$, $Li_xN_8C_{10}Si_{28}$, $Li_xN_8C_{10}Si_{24}$, $Li_xN_8C_{14}Si_{24}$, or similar permutations of N, C and Si with y being an integer, a fraction, or a number plus a fractional part and with z being an integer, a fraction, or a number plus a fractional part. In all cases, however, it is understood that N, C and Si constitute the clathrate crystallographic structure belonging to the space group Pm3̄n and $A_x$ represent guest atoms occupying the void volume of the clathrate cages. The number of guest atoms, x, that can occupy inside the cage structure depends on the atomic size of A. For relatively large atoms such as Ba, the number of Ba atoms intercalated within the cage structure is eight or less (0≤x≤8). For relatively small atoms such as Li, the number of Li atoms, x, intercalated within the cage structures depends on the specific form and stoichiometric ratio of N, C and Si. Accordingly, x is limited to a value defined by the onset of significant expansion of the lattice parameter, beyond which irreversible structural damage is likely to occur in the bulk material.

Accordingly, in the clathrate structure defined by the equation $A_xN_yC_zSi_{46-y-z}$ may be understood as one that, upon intercalcation of guest atom A, the value of x is selected such that the cage structure will preferably undergo a volume expansion of less than or equal to 50.0%, or in the range of 0.1% to 50.0% in 0.1% increments. In related context, the clathrate structure is one that upon deintercalcation, preferably undergoes a volume change (contraction) of 50.0% or less, or in the range of 0.1% to 50.0% in 0.1% increments.

Methods of Preparation

In the present disclosure, by way of representative example, a cage structure including guest atoms was prepared for the carbon-nitrogen clathrates noted above. Specifically, $Ba_8C_{18}N_{24}$ has been synthesized by arc-melting appropriate amounts of Ba and graphitic carbon nitride (g-$C_3N_{4+x}H_y$) as the starting materials. Admixtures of Ba and g-$C_3N_{4+x}H_y$ (in the proportion of 20.6 g Ba, and 4.51 g of g-$C_3N_{4+x}H_y$ powders) was arc-melted to make about 25.11 g of product, consisting of $Ba_8C_{18}N_{24}$ plus some amounts of unreacted starting materials.

Figure 7:
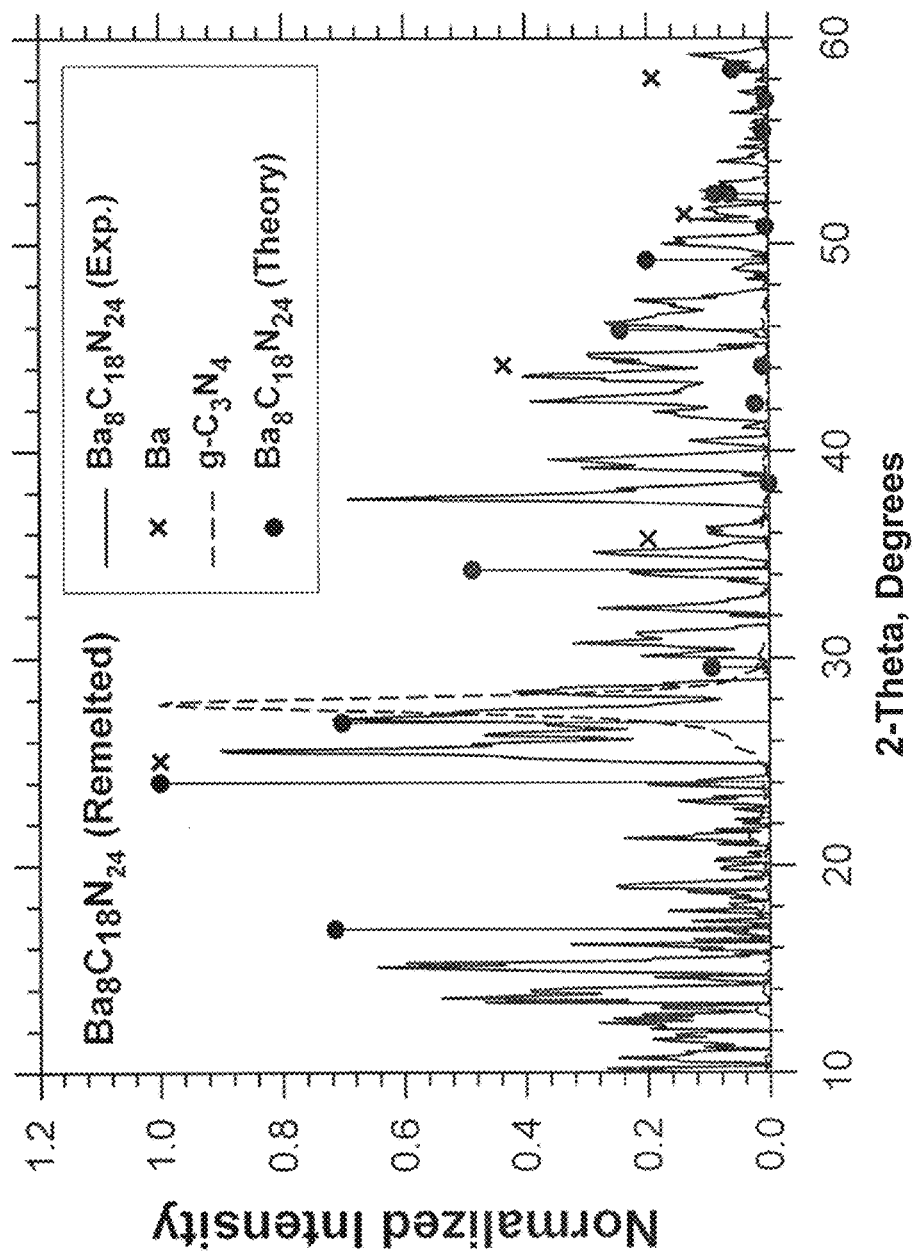
FIG. 7 illustrates powder x-ray diffraction patterns measured for the indicated compositions subsequent to arc-melting of powdered admixture of Ba and $g-C_3N_{4+x}H_y$.

Powder XRD data of the arc-melted product (i.e., not purified) is presented in FIG. 7. Some of the reflection peaks in the XRD spectra correspond to unreacted Ba and g-$C_3N_{4+x}H_y$ starting materials, where the value of x ranges from 0 to 0.1 (0<x<0.1) and the value of y also ranges from 0 to 0.1 (0<y<0.1). However, the remaining reflections in the XRD spectra do not belong to Ba and g-$C_3N_{4+x}H_y$ and have been assigned to the clathrate structure of the present invention. The theoretically-computed reflections for $Ba_8C_{18}N_{24}$ were obtained by first optimizing the Type I clathrate structures using first principles Car-Parrinello Molecular Dynamics (CPMD) computations to derive the equilibrium crystallographic parameters, followed by computing the corresponding reflections in the XRD spectrum using the analysis and visualization software called Diamond. The comparison indicates that quantities of Type I clathrate compound are present in the arc-melted $Ba_8C_{18}N_{24}$ product. The crystal structure of this clathrate compound is close to those of $Ba_8N_{18}N_{24}$ based on the characteristic reflections at 2θ of 16.9°, 24.0°, 26.9°, 34.3°, 44.9° and 49.2° for the nitrogen-substituted carbon clathrate.

Applications

It is now useful to point out the various beneficial attributes and utility for the above disclosed compositions of Type I clathrates of nitrogen-carbon, nitrogen-silicon, and nitrogen-carbon-silicon with or without guest atoms. In such compositions, the band structure and, in particular, the electrochemical work function of the alloy clathrates may be tuned by either altering the number of nitrogen atoms on the hybrid nitrogen-carbon, nitrogen-silicon, and nitrogen-carbon-silicon framework or by altering the guest atoms inserted into the cage structure of clathrate system. These electronic characteristics make this class of Type I clathrates suitable for applications as thermoelectric, electronic, energy storage, and high modulus materials.

A hybrid nitrogen, carbon, and Si framework can lead to delocalization of the band structure, reduce the band gap, and increase the electronic conductivity of the clathrate compound. The presence of nitrogen atoms on the clathrate framework can result in a smaller lattice constant and less empty space in the cage structure so that there is more electronic interaction between the guest atom and the nitrogen substituted hybrid Si and C atoms on the framework. These interactions can be tuned to enhance the Seebeck effects and electronic conductivity, alter the band gap, and reduce the thermal conductivity by adjusting the number of nitrogen atoms on the framework, the size, and the type of guest atoms inside the cage structure. For applications as energy storage materials, the band structure and, in particular, the electrochemical work function of the anode and cathode for combinations of electrodes with unique clathrate-alloy compositions may be tuned to be compatible with the rest of the battery system, including the absolute energies of the highest occupied molecular orbital (HOMO) and the lowest unoccupied molecular orbital (LUMO) of the electrolyte. This tunability of the anode and cathode may be accomplished by adjusting the stoichiometric ratios of N/A, C/A, Si/A, where A is the guest atom, or elemental form such that a desirable open-circuit potential is obtained in the charged state of the battery within a thermodynamically-stable energy range of the electrolyte. Thus, using appropriate ratios and/or elemental forms of N/A, C/A and Si/A may yield a small work function necessary for the clathrate-alloy composition to function as an anode, whereas different ratios and/or elemental form of N/A, C/A and Si/A may be used to yield a large work function necessary for the clathrate-alloy composition to function as a cathode. The battery couple (anode+cathode) that results is, therefore, based on a single class of material chemistry, though with unique ratios and elemental forms of N/A, C/A and Si/A.

Accordingly, it can be appreciated that the Type 1 carbon-nitrogen clathrates, Type 1 nitrogen-silicon clathrates, or Type 1 nitrogen-carbon-silicon clathrates herein, with or without guest atoms, may be configured such that they may be: (1) of particle form having the largest linear dimension of 0.1 μm to 100.0 μm; (2) be of electrode form wherein the electrode comprises a metal substrate and the clathrate alloy structure is present on the surface of the metal substrate; (3) be of any of the formulas noted herein: $N_yC_{46-y}$, $A_xN_yC_{46-y}$, $N_ySi_{46-y}$, $A_xN_ySi_{46-y}$, $N_yC_zSi_{46-y-z}$, or $A_xN_yC_zSi_{46-y-z}$, where A may be Li; (4) be of anode electrode form in a Li battery; (5) be of cathode electrode form in a Li battery. A Li battery may be understood as a rechargeable battery in which lithium ions move from a negative electrode to a positive electrode during discharge and when charging. During discharge lithium ions Li$^+$ carry current from the negative to the positive electrode through a non-acqueous electrolyte and separator diaphragm.

Finally, the bulk modulus of the various intermetallic clathrate compounds disclosed herein was also computed using the first-principles approach according to the expression given by:

$$\frac{\Delta E}{V} = \frac{9}{2}B\delta^2$$

where $\Delta E/V$ is the energy change per unit cell volume, B is the bulk modulus, and $\delta$ is the normal strain in the three principal directions of the unit cell. A plot of $\Delta E/V$ versus $\delta$ was obtained for each unit cell of individual clathrate compounds and the data was fitted to the above equation. The regression coefficient was then used to obtain the bulk modulus, B. A summary of the theoretical bulk modulus for various intermetallic clathrate compounds is represented in Table 1 below where experimental values are indicated by an asterisk (*)

TABLE 1

Theoretical And Experimental Bulk Moduli Values

| Compound | Structure | B, GPa |
| --- | --- | --- |
| $C_{46}$ | Type I Clathrate (Simple cubic) | 373.7 |
|  |  | 409 |
|  |  | 363.7 |
|  |  | 371 |
| $C_{18}N_{24}$ | Type I Clathrate | 257.35 |
| $C_{23}N_{23}$ | Type I Clathrate | 311.6 |
| $Li_8C_{23}N_{23}$ | Type I Clathrate | 245.18 |
| $Si_{23}C_{23}$ | Type I Clathrate | 124.03 |
| $Si_6C_{40}$ | Type I Clathrate | 196.8 |
| $Si_{18}N_{24}$ | Type I Clathrate | 96.08 |
| $Si_{23}N_{23}$ | Type I Clathrate | 114.13 |
| $C_6Si_{40}$ | Type I Clathrate | 62.9 |
| C (Diamond) | Diamond cubic | 438.8 |
|  |  | 442* |
| $\alpha$-$C_3N_4$ | Hexagonal | 378.7 |
| $\beta$-$C_3N_4$ | Cubic spinel | 419.1 |
| c-$Si_3N_4$ | Cubic spinel | 300 |
|  |  | 300* |
| SiC | Cubic (Zinc blend) | 225* |

Also shown in Table 1 for comparison are theoretical or experimental data (indicated by an asterisk) of bulk modulus for diamond, carbon nitride, silicon nitride, and silicon carbide from the literature. The results in Table 1 indicate that a wide range of bulk modulus can be obtained from Type I hybrid C—N, N—Si, and C—Si clathrates, depending on the framework atoms. As can be seen, carbon clathrate compounds exhibit bulk moduli that are in the range of 245 GPa to 374 GPa. Examples of clathrates herein ($C_{18}N_{24}$, $C_{23}N_{23}$, $Li_8C_{23}N_{23}$, $Si_{18}N_{24}$, $Si_{23}N_{23}$) are identified, and it is therefore contemplated that the carbon-nitrogen, nitrogen-silicon and nitrogen-carbon-silicon clathrates herein will similarly indicate bulk modulus values in the range of 245 GPa to 374 GPa, depending upon the final composition selected.

What is claimed is:

1. A composition comprising a Type I clathrate of silicon having a $Si_{46}$ framework cage structure in the form of a battery electrode wherein the silicon atoms on said framework are at least partially substituted by nitrogen atoms, further including one or more guest atoms within said cage structure, represented by the formula $A_xN_ySi_{46-y}$ where, A=H, Li, Na, K, Rb, Cs, Fr, Be, Mg, Ca, Sr, Ba, Ra, Eu, Cl, Br, I, and any metal or metalloid element, with 1<y<45 and x is the number of guest atoms within said cage structure wherein x has a value such that the cage structure undergoes a volume expansion of less than or equal to 50.0%.

2. The composition of claim 1 wherein A is Li.

3. The composition of claim 1 wherein said battery electrode comprises an anode electrode in a Li battery.

4. The composition of claim 1 wherein said battery electrode comprises a cathode electrode in a Li battery.

5. The composition of claim 1 wherein x is less than or equal to 200.

* * * * *